US009554093B2

(12) United States Patent
Hua et al.

(10) Patent No.: US 9,554,093 B2
(45) Date of Patent: Jan. 24, 2017

(54) AUTOMATICALLY INSERTING ADVERTISEMENTS INTO SOURCE VIDEO CONTENT PLAYBACK STREAMS

(75) Inventors: Xian-Sheng Hua, Beijing (CN); Wei Lai, Beijing (CN); Wei-Ying Ma, Beijing (CN); Shipeng Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1113 days.

(21) Appl. No.: 11/626,251

(22) Filed: Jan. 23, 2007

(65) Prior Publication Data
US 2007/0204310 A1 Aug. 30, 2007

Related U.S. Application Data

(60) Provisional application No. 60/473,358, filed on Feb. 27, 2006.

(51) Int. Cl.
*H04N 7/10* (2006.01)
*H04N 7/173* (2011.01)
(Continued)

(52) U.S. Cl.
CPC ...... *H04N 7/17318* (2013.01); *H04N 21/2387* (2013.01); *H04N 21/23424* (2013.01);
(Continued)

(58) Field of Classification Search
USPC .............................................. 725/32, 34, 36
See application file for complete search history.

(56) References Cited

U.S. PATENT DOCUMENTS 5,255,098 A 10/1993 Poivet et al.
5,600,366 A 2/1997 Schulman
(Continued)

FOREIGN PATENT DOCUMENTS

JP 2006106404 4/2006
KR 20020010285 2/2002
(Continued)

OTHER PUBLICATIONS

Hristova, et al., "Ad-me: Wireless Advertising Adapted to the User Location, Device and Emotions", Proceedings of the 37th Hawaii International Conference on System Sciences, IEEE, 2004, 10 pgs.
(Continued)

*Primary Examiner* — Michael Hong
(74) *Attorney, Agent, or Firm* — Sandy Swain; Micky Minhas; Lee & Hayes, PLLC

(57) ABSTRACT

Systems and methods for automatically inserting advertisements into source video content playback streams are described. In one aspect, the systems and methods communicate a source video content playback stream to a video player to present source video to a user. During playback of the source video, and in response to receipt of a request from the user to navigate portions of the source video (e.g., a user command to fast forward the source video, rewind the source video, or other action), the systems and methods dynamically define a video advertisement clip insertion point (e.g., and insertion point based on a current playback position). The systems and methods then insert a contextually relevant and/or targeted video advertisement clip into the playback stream for presentation to the user.

20 Claims, 4 Drawing Sheets

(51) Int. Cl.
*H04N 21/234* (2011.01)
*H04N 21/2387* (2011.01)
*H04N 21/472* (2011.01)
*H04N 21/6587* (2011.01)
*H04N 21/81* (2011.01)

(52) U.S. Cl.
CPC ... *H04N 21/47202* (2013.01); *H04N 21/6587* (2013.01); *H04N 21/8133* (2013.01)

(56) References Cited

U.S. PATENT DOCUMENTS

| | | | |
|---|---|---|---|
| 5,671,253 | A | 9/1997 | Stewart |
| 5,848,396 | A * | 12/1998 | Gerace ............... G06Q 30/02 705/14.49 |
| 5,915,250 | A | 6/1999 | Jain et al. |
| 6,072,542 | A | 6/2000 | Wilcox et al. |
| 6,425,127 | B1 * | 7/2002 | Bates et al. ............ 725/32 |
| 6,519,283 | B1 | 2/2003 | Cheney et al. |
| 6,698,020 | B1 * | 2/2004 | Zigmond et al. ............ 725/34 |
| 6,704,930 | B1 | 3/2004 | Eldering et al. |
| 6,718,551 | B1 * | 4/2004 | Swix et al. ............ 725/32 |
| 6,950,623 | B2 | 9/2005 | Brown et al. |
| 7,064,857 | B2 | 6/2006 | Parker et al. |
| 7,206,854 | B2 | 4/2007 | Kauffman et al. |
| 7,209,882 | B1 | 4/2007 | Cosatto et al. |
| 7,246,314 | B2 | 7/2007 | Foote et al. |
| 7,296,231 | B2 | 11/2007 | Loui et al. |
| 7,428,345 | B2 | 9/2008 | Caspi et al. |
| 7,451,099 | B2 | 11/2008 | Henkin et al. |
| 7,707,605 | B2 | 4/2010 | Yamada et al. |
| 2001/0034646 | A1 | 10/2001 | Hoyt et al. |
| 2002/0053078 | A1 * | 5/2002 | Holtz ............... G06Q 30/06 725/14 |
| 2002/0059591 | A1 | 5/2002 | Nakagawa |
| 2002/0100042 | A1 | 7/2002 | Khoo et al. |
| 2002/0103698 | A1 | 8/2002 | Cantrell |
| 2002/0113815 | A1 | 8/2002 | DeGross |
| 2002/0124251 | A1 | 9/2002 | Hunter et al. |
| 2002/0147637 | A1 | 10/2002 | Kraft et al. |
| 2002/0178447 | A1 * | 11/2002 | Plotnick ............... H04N 5/445 725/36 |
| 2003/0187737 | A1 | 10/2003 | Naito |
| 2003/0188308 | A1 | 10/2003 | Kizuka |
| 2003/0191688 | A1 | 10/2003 | Prince, III et al. |
| 2004/0034874 | A1 * | 2/2004 | Hord ............... H04N 5/76 725/136 |
| 2004/0045028 | A1 | 3/2004 | Harris |
| 2004/0073947 | A1 * | 4/2004 | Gupta ............... 725/134 |
| 2004/0078188 | A1 | 4/2004 | Gibbon et al. |
| 2004/0093327 | A1 | 5/2004 | Anderson et al. |
| 2004/0117827 | A1 | 6/2004 | Karaoguz et al. |
| 2004/0133909 | A1 * | 7/2004 | Ma ............... G06Q 30/0207 725/34 |
| 2004/0148221 | A1 | 7/2004 | Chu |
| 2004/0161154 | A1 | 8/2004 | Hua et al. |
| 2004/0194130 | A1 | 9/2004 | Konig et al. |
| 2004/0204985 | A1 | 10/2004 | Gibson et al. |
| 2004/0221304 | A1 | 11/2004 | Sparrell et al. |
| 2004/0223052 | A1 | 11/2004 | Sugano et al. |
| 2005/0018216 | A1 * | 1/2005 | Barsness et al. ............ 358/1.6 |
| 2005/0076357 | A1 | 4/2005 | Fenne |
| 2005/0114198 | A1 | 5/2005 | Koningstein et al. |
| 2005/0114526 | A1 | 5/2005 | Aoyama |
| 2005/0116965 | A1 | 6/2005 | Grunder |
| 2005/0123886 | A1 | 6/2005 | Hua et al. |
| 2005/0137958 | A1 | 6/2005 | Huber et al. |
| 2005/0166224 | A1 | 7/2005 | Ficco |
| 2005/0172234 | A1 | 8/2005 | Chuchla |
| 2005/0240580 | A1 | 10/2005 | Zamir et al. |
| 2005/0264703 | A1 | 12/2005 | Aoki |
| 2005/0283793 | A1 | 12/2005 | Chiu |
| 2006/0020961 | A1 | 1/2006 | Chiu |
| 2006/0026013 | A1 | 2/2006 | Kraft |
| 2006/0026628 | A1 | 2/2006 | Wan et al. |
| 2006/0100928 | A1 | 5/2006 | Walczak, Jr. et al. |
| 2006/0111979 | A1 | 5/2006 | Chu |
| 2006/0128469 | A1 | 6/2006 | Willis et al. |
| 2006/0179453 | A1 | 8/2006 | Kadie et al. |
| 2006/0212350 | A1 | 9/2006 | Ellis et al. |
| 2006/0247037 | A1 | 11/2006 | Park |
| 2007/0019261 | A1 | 1/2007 | Chu |
| 2007/0050253 | A1 | 3/2007 | Biggs et al. |
| 2007/0055983 | A1 | 3/2007 | Schiller et al. |
| 2007/0055985 | A1 * | 3/2007 | Schiller ............... G06F 13/4027 725/34 |
| 2007/0061204 | A1 | 3/2007 | Ellis et al. |
| 2007/0067493 | A1 | 3/2007 | Issa |
| 2007/0130015 | A1 | 6/2007 | Starr et al. |
| 2007/0157228 | A1 * | 7/2007 | Bayer et al. ............ 725/34 |
| 2007/0198285 | A1 | 8/2007 | Mottla et al. |
| 2007/0198506 | A1 | 8/2007 | Attaran Rezaei et al. |
| 2007/0226062 | A1 | 9/2007 | Hughes et al. |
| 2007/0300152 | A1 | 12/2007 | Baugher |
| 2008/0082405 | A1 | 4/2008 | Martinez et al. |
| 2008/0112684 | A1 | 5/2008 | Matsushita et al. |
| 2008/0250449 | A1 | 10/2008 | Torkos |
| 2009/0076882 | A1 | 3/2009 | Mei et al. |
| 2009/0079871 | A1 | 3/2009 | Hua et al. |
| 2009/0099900 | A1 | 4/2009 | Boyd et al. |
| 2011/0125578 | A1 | 5/2011 | Alspector et al. |

FOREIGN PATENT DOCUMENTS

| | | |
|---|---|---|
| KR | 20060073578 | 6/2006 |
| KR | 20060112841 | 11/2006 |
| KR | 20060114245 | 11/2006 |
| WO | WO0133752 A1 | 5/2001 |
| WO | WO0180039 A2 | 10/2001 |
| WO | WO2005086081 A1 | 9/2005 |
| WO | WO2005086969 A2 | 9/2005 |

OTHER PUBLICATIONS

IBM E-Business Solutions, "Hitplay Media Streams Video into Dollars with WebSphere Application Server", Available at http://abf-dss.com/pdf/HitPlay1.pdf, 2000, 4 pgs.

Weeks, "Web-Based Video Advertising Is Red Hot", Available at http://www.imediaconnection.com/content/3544.asp, May 27, 2004, 4 pgs.

U.S. Appl. No. 11/767,410, filed Jun. 22, 2007, Hua et al, "Image Advertising System."

"AdBrite", retrieved on Apr. 26, 2007, at <<http://www.adbrite.com/mb/about_video.php>>, 1 pg.

"AdSense and Video Sites: A New Way to Make Money", retrieved on Nov. 5, 2007 at <<http://incomeblogs.blogspot.com/2006/12/adsense-and-video-sites-new-way-to.html>>, Dec. 3, 2006, 4 pgs.

"BritePic", retrieved on Apr. 26, 2007, at <<http://www.britepic.com/learnmore.php>>, Adbrite, 2007, pp. 1-2.

"Contextual In-Video Advertising: ScanScout", retrieved on 44/5/2007 at <<http://www.techcrunch.com/2007/05/14/contextual-in-video-advertising-scanscout/>>, May 14, 2007, 4 pgs.

Deng et al, "Unsupervised Segmentation of Color-Texture Regions in Images and Video," IEEE Transactions on Pattern Analysis and Machine Intelligence, vol. 23, No. 8, Aug. 2001, 27 pgs.

"Google AdWords Editorial Guidelines for Image Ads", retrieved on Apr. 26, 2007, at <<https://adwords.google.com/select/imageguidelines.html>>, Google Ad Words, 2006, pp. 1-9.

Hua et al, "Microsoft Research Asia TRECVID 2006: High-level Feature Extraction and Rushes Exploitation," TREC Video Retrieval Evaluation Online Proceedings, 2006, 9 pgs.

Hua et al, "Personal Media Sharing and Authoring on the Web," ACM, MM'05, Singapore, Nov. 6-11, 2005, 4 pgs.

Levin et al, "A Closed Form Solution to Natural Image Matting," In Proceedings of IEEE Computer Vision and Pattern Recognition, 2006, 10 pgs.

Liu et al, "Video Collage," In Proceedings of ACM International Conference on Multimedia, ACM, MM'07, Augsburg, Germany, Sep. 23-28, 2007, pp. 461-462.

(56) References Cited

OTHER PUBLICATIONS

Ma et al, "User Attention Model based Video Summarization," IEEE Transactions on Multimedia Journal, 2005, 13 pgs.
Mei, et al., "Videosense: A Contextual Video Advertising System", at <<ttp://delivery.acm.org/10.1145/1300000/1291342/p463-mei.pdf?key1=1291342&key2=2633334911&coll=GUIDE&dl=&CFID=41780570&CFTOKEN=13059784>>, ACM, MM'07, Augsburg, Bavaria, Germany, Sep. 23-28, 2007, pp. 463-464.
Mei, et al., "Videosense: Towards Effective Online Video Advertising", at <<http://research.microsoft.com/%7Exshua/publications/pdf/2007_ACMMM_VideoSense.pdf >>, ACM, MM'07, Augsburg, Bavaria, Germany, Sep. 23-28, 2007, 10 pgs.
Perez et al, "Poisson Image Editing," ACM Transactions on Graph, 2003, pp. 313-318.
Shi et al, "Normalized Cuts and Image Segmentation," IEEE Transactions on Pattern Analysis and Machine Intellience, vol. 22, No. 8, Aug. 2000, pp. 888-905.
Wang et al, "Video Collage: A Novel Presentation of Video Sequence," In Proceedings of IEEE International Conference on Multimedia & Expo, Jul. 2007, pp. 1479-1482.
www.VibrantMedia.com, available at lease as early as Nov. 1, 2007, 4 pgs.
"Blinkx", retrived on Nov. 18, 2008 at <<www.blinkx.com\wall>>, 1 page.
Hjelsvold, et al., "Web-based Personalization and Management of Interactive Video", found at <<http://delivery.acm.org/10.1145/380000/371969/p129-hjelsvold.pdf?key1=371969&key2=7668361811&coll=GUIDE&dl=GUIDE&CFID=25387987&CFTOKEN=45755316>>, Proceedings of 10th Intl Conf on World Wide Web, 2001, pp. 129-139.
Hua et al., "Optimization-Based Automated Home Video Editing System", IEEE Transactions on Circuits and Systems for Video Technology, May 2004, vol. 14, Issue 5, 25 pgs.
Irani et al., "Mosaic Based Representations of Video Sequences and Their Applications", retrived on Nov. 18, 2008, <<http://ieeexplore.ieee.org/stamp/stamp.jsp?arnumber+466883&isnumber=9796>>, pp. #605-pp. #611.
Irani et al., "Video Indexing Based on Mosaic Representations", 1998 IEEE, vol. 86, No. 5, May 1998, 17 pgs.
Jia, et al, "Video Completion using Tracking and Fragment Merging", retrieved on Nov. 18, 2008, at <<http://ralph.cs.cf.ac.uk/papers/Geometry/videocompletion.pdf>>pp. #1-pp. #9.
Kang et al., "Correlated Label Propagation with Application to Multi-Label Learning", 2006 IEEE Computer Society Conf on Computer Vision and Pattern Recognition, 8 pgs.
Kang et al, "Space-Time Video Montage", retrived on Nov. 18, 2008, <<https://www.hwkang.com/files/ CVPR06VideoMontage.pfd>>, 8 pages.
Lu et al., "Content-Based Audio Classification and Segmentation by Using Support Vector Machines", Multimedia Systems, vol. 8, No. 6, Apr. 2003, pp. 482-491.
Ma et al., "A Generic Framework of User Attention Model and Its Application in Video Summarization", IEEE Transactions on Multimedia, vol. 7, No. 5, Oct. 2005, 13 pgs.
Ma et al., "A User Attention Model for Video Summarization", Proceedings 10th ACM Intl Conf on Multimedia, Dec. 2002, 10 pgs.
Magnor et al, "Spacetime-coherent Geometry Reconstruction from Multiple Video Streams", retrieved on Nov. 18, 2008, <<http://graphics.tu-bs.de/people/magnor/publications/3dpvt04.pdf>>, 8 pages.
Mei et al., "MSRA-USTC-SJTU at TRECVID 2007: High Level Feature Extraction and Search", TREC Video Retrieval Evaluation Online Proceedings, 2007, 12 pgs.
Mei et al., "VideoSense-Towards Effective Online Video Advertising", Proceedings 15th Intl conf on Multimedia, ACM, Sep. 2007, 10 pgs.
Ney et al., "Data Driven Search Organization for Continuous Speech Recognition", IEEE Transactions on Signal Processing, vol. 40, No. 2, Feb. 1992, 10 pgs.
Platt, "AutoAlbum: Clustering Digital Photgraphs Using Probabilistic Model Merging", IEEE Workshop on Content-Based Access of Images and Video Libraries, 2000, 6 pgs.
Qi et al., "Video Annotation by Active Learning and Cluster Tuning", 2006 Conf on Computer Vision and Pattern Recognition Workshop, Jun. 2006, 8 pgs.
Rabiner, "A Tutorial on Hidden Markov Models and Selected Applications in Speech Recognition" Proceedings IEEE, vol. 77, No. 2, Feb. 1989, 30 pgs.
Rav-Acha et al., "Making a Long Video Short: Dynamic Video Synopsis", Proceedings 2006 IEEE Computer Society Conf on Computer Vision and Pattern Recognition, 2006, 7 pg.
Rother et al., "AutoCollage", Proceedings ACM SIGGRAGPH, 2006, 6 pgs.
Smith et al., "Video Skimming and Characterization Through the Combination of Image and Language Understanding", IEEE 1998 Intl Workshop on Content-Based Access of Image and Video Databases, Jan. 3, 1998, 10 pgs.
Song et al., "An Automatic Video Semantic Annotation Scheme Based on Combination of Complementary Predictors", IEEE Intl Conf on Acoustics, Speech and Signal Processing, May 2006, 4 pgs.
Song et al., "Efficient Semantic Annotation Method for Indexing Large Personal Video Database", Proceedings 8th ACM Intl workshop on Multimedia Information Retrieval, Oct. 2006, pp. 289-296.
Song et al., "Semi-Automatic Video Annotation Based on Active Learning with Multiple Complementary Predictors", Proceedings 7th ACM SIGMM Intl Workshop on Multimedia Information Retrieval, Nov. 2005, pp. 97-103.
Song et al., "Semi-Automatic Video Semantic Annotation Based on Active Learning", Intl Conf on Visual Communications and Image Processing, Jul. 2005, 8 pgs.
Song et al., "Video Annotation by Active Learning and Semi-Supervised Ensembling", 2006 IEEE Intl Conf on Multimedia and Expo, Jul. 2006, pp. 933-936.
Subrahmanian, et al, "The CPR Model for Summarizing Video", retrieved on Nov. 18, 2008,<<http://delivery.acm.org/10.1145/960000/951679/p2-fayzullin.pdf?key1=951679&key2=4658707221&coll=GUIDE&dl=GUIDE&CFID=11563131&CFTOKEN=25393126>>, pp. #2-#9.
Tang et al., "To Construct Optimal Training Set for Video Annotation", Proceedings 14th Annual ACM Intl Conf on Multimedia, Oct. 2006, pp. 89-92.
Wan, et al., "Advertising Insertion in Sports Webcasts", found at <<http://info.computer.org/portal/cms_docs_multimedia/multimedia/content/Promo/u2078_2007.pdf>>, IEEE, 2007, pp. 78-82.
Wang et al., "Automatic Video Annotation by Semi-Supervised Learning with Kernel Density Estimation", Proceedings 14th Annual ACM Intl Conf on Multimedia, Oct. 2006, pp. 967-976.
Wang et al., "Enhanced Semi-Supervised Learning for Automatic Video Annotation", 2006 IEEE Intl Conf on Multimedia and Expo, Jul. 2006, pp. 1485-1488.
Wang et al., "Semi-Supervised Kernel Regression", 6th IEEE Intl Conf on Data Mining, 2006, 6 pgs.
Winn et al., "Object Categorization by Learned Universal Visual Dictionary", Proceedings 10th IEEE Intl Conf on Computer Vision, vol. 2, 2005, 8 pgs.
Yeung et al., "Video Visualization for Compact Presentation and Fast Browsing of Pictorial Content", IEEE Transactions on Circuits and Systems for Video Technology, vol. 7, No. 5, Oct. 1997, 15 pgs.
Yuan et al., "Automatic Video Genre Categorization Using Hierarchical SVM", 2006 IEEE Intl Conf on Image Processing, Oct. 2006, 4 pgs.
Yuan et al., "Manifold-Ranking Based Video Concept Detection on Large Database and Feature Pool", Proceedings 14th Annual ACM Intl Conf on Multimedia, Oct. 2006, pp. 623-626.
Zhang et al., "A New Shot Boundary Detection Algorithm", IEEE Pacific Rim Conf on Multimedia, 2001, 7 pgs.
Zhang et al., "Automatic Partitioning of Full-Motion Video", Multimedia Systems, vol. 1, No. 1, 1993, 19 pgs.
Zhao et al., "Video Shot Grouping Using Best-First Model Merging", Storage and Retrieval for Media Databases, 2001, 8 pgs.

(56) References Cited

OTHER PUBLICATIONS

The Beatroot, "Polish Plumber Gets the Sack", Available at <<http://beatroot.blogspot.com/2006/01/polish-plumber-gets-sack.html>>, Jan. 20, 2006, pp. 1-3.
Warhol Workboots, Tagllalatella Galleries, Retrieved on Oct. 15, 2010, <<http://www.bing.com/images/search?q=advertising+pictures+and+(positive+to+negative+(image+or+picture))8,FORM=IGRE&qpvt=advertising+pictures+and+(positive+to+negative+(image+or+picture))#focal=f5ecc98fd70f615c3bf447ce5b13abf1&furl=http%3A%2F%2Fwww.djtfineart.com%2Fimages%2Fartwork%2Full%2FWarhol006.jpg—Warhol Workboots>> 1 pg.
Office Action for U.S. Appl. No. 12/143,696, mailed on Dec. 6, 2011, Tao Mei, "Impressionative Multimedia Advertising", 23 pgs.
Conheady, "PhotoShop Tutorial: Using Adjustment Layers and Masking", Retrieved on Feb. 25, 2011 at <<http://nyfalls.com/article-photoshop-adjustment-layers.html, copyright 2006 Matthew Conheady (v1.0), 5 pgs.
Elkin, "Microsoft's MSN Fattens Banners With Rich Media; Click-through Rates Double for Unilever's Dove in Ad Test", Crain Communications, Advertising Age, vol. 71, Sep. 2000, p. 52.
Lyons, et al., "Multimodal Interactive Advertising", In the Proceedings of the Workshop on Perceptual User Interfaces (PUI'98), Nov. 1998, 4 pgs.
Neatware.com, "Digital Signage", Retrieved on Feb. 25, 2011 at <<http://web.archive.org/web/20070827183554/http://www.neatware.com/player/app_signage.html>>, 7 pgs.
Walker, et al., "The Impact of Comparative Advertising on Perception Formation in New Product Introductions", Association for Consumer Research, Advances in Consumer Research, vol. 13, 1986, 8 pgs.
Yan, "Basic PhotoShop Skill: Editing the Background", Retrieved on Feb. 1, 2011 at <<http://www.fubargenre.com/2007/04/01/basic-photoshop-skill-editing-the-background/>>, Apr. 1, 2007, 13 pgs.

Office Action for U.S. Appl. No. 11/858,628, mailed on Aug. 18, 2011, Xian-Sheng Hua, "Advertisement Insertion Points Detection for Online Video Advertising", 12 pgs.
Office Action for U.S. Appl. No. 12/143,696, mailed on Aug. 19, 2011, Tao Mei, "Impressionative Multimedia Advertising", 30 pgs.
Non-Final Office Action for U.S. Appl. No. 12/334,231, mailed on Sep. 16, 2011, Tao Mei, "Multi-Video Synthesis", 21 pages.
Office Action for U.S. Appl. No. 11/767,410, mailed on Mar. 1, 2012, Xian-Sheng Hua, "Image Advertising System", 20 pgs.
Office Action for U.S. Appl. No. 11/858,628, mailed on Mar. 1, 2012, Xian-Sheng Hua, "Advertisement Insertion Points Detection for Online Video Advertising", 17 pgs.
Final Office Action for U.S. Appl. No. 12/143,696, mailed on May 3, 2011, Tao Mei et al., "Impressionative Multimedia Advertising", 29 pgs.
Office action for U.S. Appl. No. 11/858,628, mailed on May 21, 2013, Hua et al., "Advertisement Insertion Points Detection for Online Video Advertising", 25 pages.
Office action for U.S. Appl. No. 11/858,628, mailed on Jan. 16, 2013, Hua et al., "Advertisement Insertion Points Detection for Online Video Advertising", 18 pages.
Office action for U.S. Appl. No. 12/143,696, mailed on Oct. 15, 2012, Mei et al., "Impressionative Multimedia Advertising", 28 pages.
Office action for U.S. Appl. No. 11/767,410, mailed on Oct. 24, 2012, Hua et al., "Image Advertising System", 26 pages.
Grundland et al., "Cross Dissolve Without Cross Fade: Preserving Contrast, Color and Salience in Image Compositing", Eurographics, vol. 25, No. 3, 2006, 10 pages.
Office action for U.S. Appl. No. 12/143,696, mailed on Mar. 14, 2013, Mei et al., "Impressionative Multimedia Advertising", 32 pages.

* cited by examiner

US 9,554,093 B2

AUTOMATICALLY INSERTING ADVERTISEMENTS INTO SOURCE VIDEO CONTENT PLAYBACK STREAMS

RELATED APPLICATIONS

This patent application claims priority to U.S. provisional patent application Ser. No. 60/743,358, titled Advertisement Platform for Online Videos", filed on Feb. 27, 2006, and hereby incorporated by reference.

BACKGROUND

Video advertisements typically have a greater impact on viewers than traditional online text-based advertisements. Internet users frequently stream online source video for viewing. A search engine may have indexed such a source video. The source video may be a video stream from a live camera, a movie, or any videos accessed over a network. If a source video includes a video advertisement clip (a short video, an animation such as a Flash or GIF, still image(s), etc.), a human being has typically manually inserted the video advertisement clip into the source video. Manually inserting advertisement video clips into source video is a time-consuming and labor-intensive process that does not take into account the real-time nature of interactive user browsing and playback of online source video.

SUMMARY

Systems and methods for automatically inserting advertisements into source video content playback streams are described. In one aspect, the systems and methods communicate a source video content playback stream to a video player to present source video to a user. During playback of the source video, and in response to receipt of a request from the user to navigate portions of the source video (e.g., a user command to fast forward the source video, rewind the source video, or other action), the systems and methods dynamically define a video advertisement clip insertion point (e.g., and insertion point based on a current playback position). The systems and methods then insert a contextually relevant and/or targeted video advertisement clip into the playback stream for presentation to the user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
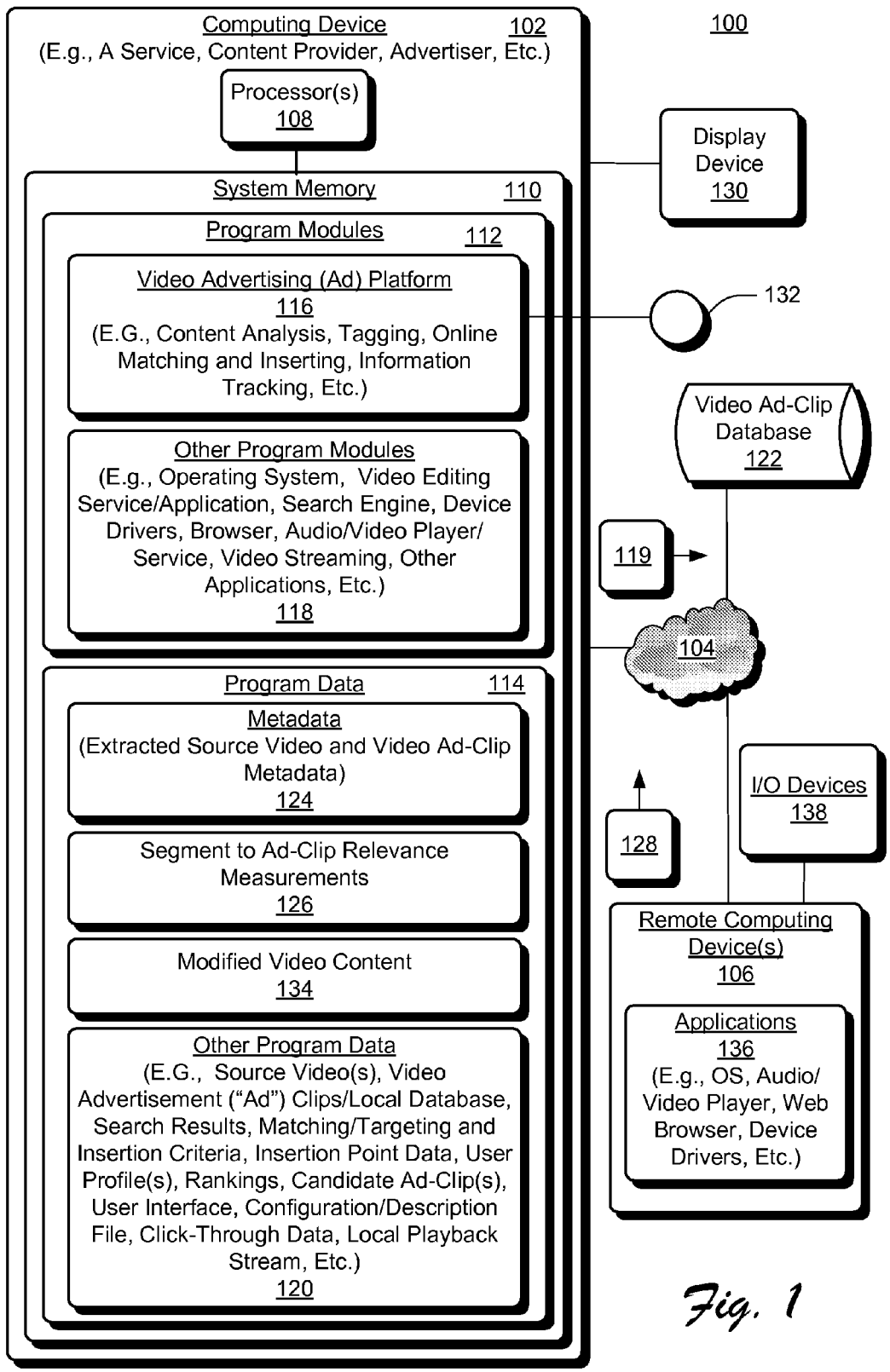
FIG. 1 shows an exemplary system for automatically inserting advertisements into source video content playback streams, according to one embodiment.

Systems and methods for automatically inserting advertisements into source video content playback streams are described. As video source content is being rendered (e.g., played/streamed) for presentation to a viewer, the systems and methods, automatically insert advertisements (ad-clips) at appropriate positions (insertion points) into the corresponding source video content playback stream. In one implementation, the systems and methods insert ad-clip(s) that are contextually relevant to a segment (e.g., a shot, scene, and/or chapter of the source content) adjacent to a corresponding insertion point. Such contextual relevance includes, for example, on one or more of genre or semantic relevance, visual/perceptual relevance, and object relevance. A shot is a number of sequential image frames comprising an uninterrupted segment of a source video sequence. A scene is a series of consecutive shots, which are similar in terms of visual features, audio features and/or semantics. One example of scene is a series of consecutive shots taken at the same location. In one implementation, and to avoid interruption of shot or scene playback, the systems and methods insert ad-clips into a playback stream at scene or shot breaks/boundaries.

In another implementation, content of the inserted ad-clip(s) is relevant or targeted to information in a user profile of a person that selected the source content (e.g., from a set of video search results, etc.) for viewing. In one implementation, the user profile reflects one or more of the person's age, demographics, prior browsing history, and/or other arbitrary user-based information. In yet another implementation, the systems and methods select/match the ad-clip for insertion into the source video content playback stream so that it is both targeted to a user profile and contextually relevant to a segment of the source video adjacent to a corresponding to insertion point. Conventional ad-clip insertion techniques do not consider relevancy between video content and an advertisement clip being inserted into video content, nor do such conventional techniques consider relevancy between the advertisement clip and the viewer, etc In one implementation, ad-clip insertion points are predetermined (static) with respect to the timeline associated with the source video content. Statically defined ad-clip insertion positions along the timeline are based, for example, on one or more of length of the source content, the number of contextually relevant and/or targeted ad-clips to insert into the playback stream, length of respective ones of the ad-clips, etc. In another implementation, the systems and methods dynamically define ad-clip insertion points based on actions of the viewer. Such actions include requests initiated by the viewer (e.g., by a button press, voice command, or other means) to navigate portions of the source video, for example, with fast forward, skip, seek, pause, rewind, and/or other commands. Responsive to such an action, it is possible that portions of the source video with respect to where ad-clips may have otherwise been inserted (e.g., via a statically defined insertion point strategy, etc.) will be skipped, and thus not viewed. The dynamic video ad-clip insertion strategy of these systems and methods for automatically inserting advertisements into source video content playback streams substantially ensures that ad-clip(s) are present a to a user for viewing, even when the user fast forwards, reverses, seeks, and/or skips portions of the source video that would otherwise correspond to predetermined ad-clip insertion points.

These and other aspects of the systems and methods for automatically inserting advertisements into source videos are now described in greater detail An Exemplary System Although not required, the systems and methods for automatically inserting advertisements into source video content playback streams are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for automatically inserting video advertisement clips (ad-clips) into a source video content playback stream, according to one embodiment. System 100 includes one or more computing devices 102 coupled across network 104 to one or more remote computing devices 106. Network 104 may include any combination of a local area network (LAN) and a general wide area network (WAN) communication environments, such as those that are commonplace in offices, enterprise-wide computer networks, intranets, and the Internet. Computing devices 102 and 106 represent, for example, general-purpose computing devices such as servers, clients, laptops, mobile computing devices, etc. Each computing device 102 and 106 includes one or more processors coupled to system memory comprising computer-program instructions executable by the processor. For example, computing device 102 includes one or more processors 108 coupled to system memory 110. System memory 110 includes program modules 112 (i.e., computer-program instructions) executable by the processor and program data 114. In this implementation, for example, program modules 112 include video advertisement ("ad") platform 116 and "other program modules 118 such as an operating system to provide a runtime environment, device drivers, and other applications.

As computing device 102 renders (e.g., plays or streams) video source content for presentation to a viewer, video ad platform 116 automatically inserts ad-clips at appropriate positions (insertion points) in a corresponding source video content playback stream. For purposes of exemplary illustration such a source video content playback stream is shown as playback stream 119 in FIG. 1. Although such ad-clips may be video ad-clips, text, or represent other types of media content (e.g., audio), for purposes of exemplary illustration, such ad-clips are hereinafter video ad-clips. For purposes of exemplary illustration, respective portions of other program data 120 (e.g., a local database) and/or remote database(s) 122 represent ad-clips and source video content for downloading, uploading, streaming, etc. for presentation to a user. In one implementation, source video content is indexed by a search engine, from a camera, a live television show/movie, and/or any video accessible (e.g., via a URL) locally or over network 104. For simplicity, "source video content" is hereinafter often referred to as "source video" or "source content".

Figure 2:
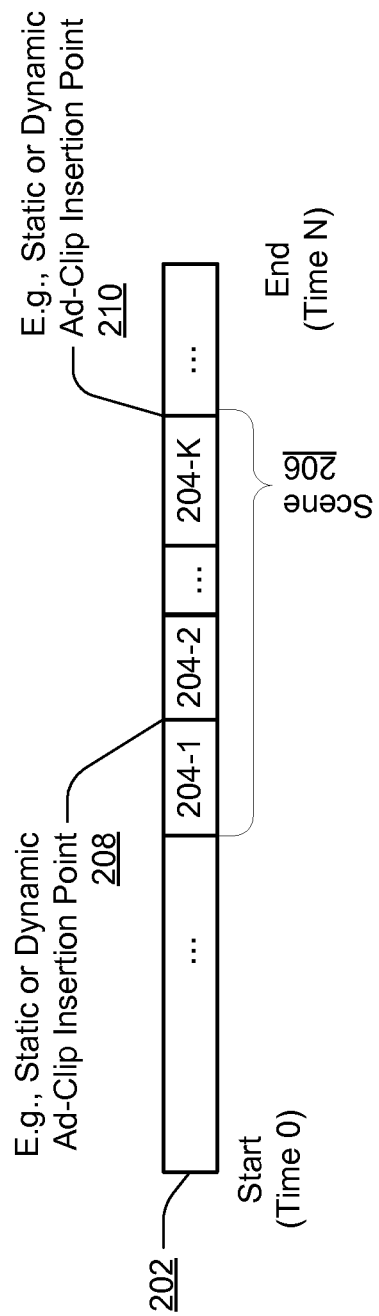
FIG. 2 shows an exemplary layout of a source video playback stream over time, according to one embodiment.

In one implementation, video ad platform 116 inserts ad-clip(s) that are contextually relevant to a segment (e.g., a shot, scene, and/or chapter of the source content) adjacent to a corresponding insertion point. In this particular context, use of the term "insert" or "inserts" means that as video ad platform 116 streams or plays portions of the source video content to a user, video ad platform introduces ad-clip(s) into the playback stream (not into the source video content) at insertion points for presentation to the user. As described below in the section titled "Video Ad-Clip Insertion Points", such insertion points are statically or dynamically defined with respect to a timeline of the source video content. Although the insertion points are defined with respect to the source video content's timeline, it can be appreciated that start and end times of the corresponding playback stream are a function of length of the source video, length of ad-clips inserted into the playback stream, user actions (fast forward, rewind, etc.), etc. FIG. 2 shows an exemplary layout of a source video playback stream 202, according to one embodiment. As shown, the playback stream starts at a time zero (0) and ends at time N. The playback stream includes a number of shots 204-1 through 204-K. One or more such shots comprise a scene 206. In one implementation, video ad platform 116 inserts one or more ad-clips into the playback stream 202 at one or more shot boundaries (e.g., shot boundary 208) and/or scene boundaries (e.g., scene boundary 210).

An ad-clip that is contextually relevant to a segment of source video will exhibit one or more of genre or semantic relevance, visual relevance, and/or object relevance to the segment. Genre or semantic relevance is based on the relevance of a genre of the segment to respective genres of the video ad-clips. For example, source videos and ad-clips are associated with genre(s). Genres include, for example, news, movies, sitcoms, home videos, etc. A genre may have a hierarchy. For example, a movie genre may be further classified as a comedy, action video, romance, etc. Video ad platform 116 may use genre or semantics associated with the segment to match the segment to one or more video ad-clips. For example, video ad platform 116 may insert an action-based ad-clip adjacent to an action-based segment of source video. Visual relevance measures similarities/differences between one or more of dominant colors, motions, and semantic classifications associated with the segment and the video ad-clips. Object (e.g., cars, people, animals, trees, etc.) relevance finds object(s) in video ad-clip(s) that are relevant to object(s) in the segment.

In another implementation, video ad platform 116 inserts ad-clip(s) that are relevant or targeted to information in a user profile into appropriate positions relative to portion(s) of the source video content. These targeted ad clips are inserted at statically or dynamically defined insertion points with respect to a timeline of the source video content (this is described in greater detail below in the section titled "Video Ad-Clip Insertion Points"). In one implementation, the user profile is associated with an entity (e.g., a person or organization that selected (e.g., from a set of search results, etc.) the source video content for viewing. In one implementation, the user profile reflects one or more of the person's age, demographics, prior browsing history, and/or other arbitrary user-based information. For example, if a user profile indicates that a viewer is interested in automobiles, video ad platform 116 may insert ad-clip(s) about automobiles into appropriate positions relative to portion(s) of the source content (i.e., as the content is being played or streamed for presentation), rather than inserting ad-clips that do not reflect documented user interests. In another example, an ad-clip directed to teenagers is relevant to a source video being presented to a teenager. Techniques to generate such user profiles are known. In yet another implementation, video ad platform 116 selects/matches an ad-clip for insertion adjacent to a segment of the source video so that the ad-clip is both targeted to a user profile and contextually relevant to a segment adjacent to a corresponding insertion point. Exemplary techniques for matching respective ones of the ad-clips to insertion points in source video content are now described.

Identifying Candidate Ad-Clips for Insertion

To identify one or more video matching ad-clips to insert at a particular insertion point in a source video content playback stream, video ad platform 116 first analyzes the source video content and available ad-clip(s) to identify and extract metadata 124. With respect to any particular source video content or video ad-clip content, metadata 124 indicates one or more of genre, semantics, visual features, object features, etc. of the content. In one implementation, metadata 124 includes, for example, one or more of the following:

low-level content-based features (e.g., color, motion information, etc.);
 high-level semantic attributes such as genre (news, movies, sitcoms, home videos, comedies, action, romance, etc.), location (city, mountain, beach, street, landscape, etc.), objects (e.g., people, cars, etc.);
 textual information from encapsulated tags, closed captions, automatic speech recognition, etc.

In one implementation, video ad platform 116 obtains at least a subset of metadata 124 using exemplary operations described in U.S. patent application Ser. No. 11/276,364, titled "Video Search and Services", filed on Feb. 27, 2006, which is hereby incorporated by reference.

In one implementation, an administrator (e.g., a content provider, advertiser, etc.) adds text directly into source video content and/or a video ad-clip (e.g., using an XML editor, a video editor, etc.) to provide respective portions of metadata 124. In one implementation, such text is represented as one or more XML tags in a header or other portion associated with the source video content. Such textual descriptions are arbitrary. For example, exemplary such text may provide content description, indicate semantic attributes of a video segment (i.e., a shot, a scene, or a chapter), provide a cue as to the particular genre or other attribute of a video ad-clip for insertion at a particular insertion point, etc. In one implementation, such text identifies a particular video ad-clip, indicates that an inserted ad-clip should match one or more characteristics of a viewer's profile, etc.

Video ad platform 116 determines whether content of a particular ad-clip is contextually relevant to a source video segment adjacent to an insertion point by evaluating the metadata 124 associated with the source video and/or segment in view of the particular metadata 124 associated with the video ad-clip. Such segment metadata and ad-clip metadata evaluation operations generate respective relevance measurements 126. In one implementation, metadata 124 is represented as an n-dimensional (n is an integer number, say, 20) feature vector. The relevancy between a video segment and an ad-clip is measured by the similarity between the two corresponding feature vectors. There are many known techniques to generate such similarity measures. In one implementation, a correlation coefficient of two normalized feature vectors is utilized as a similarity/relevancy measurement 126.

In another implementation, video-ad platform 116 converts non-textual metadata into textual information or keywords using the techniques described in U.S. patent application Ser. No. 11/276,364, titled "Video Search and Services", filed on Feb. 27, 2006, which is incorporated by reference. Then video ad platform 116 compares the similarity between two sets textual data. In one implementation, video ad platform 116 uses BM25 (S. E. Robertson, S. Walker, and M. Beaulieu. *Okapi at TREC 7. automatic ad hoc, filtering, VLC and filtering tracks. In Proceedings of TREC'99.*) to compute similarity or relevancy between two textual data or documents. Video ad platform 116 uses relevance measurements 126 to identify video ad-clip(s) that are most contextually relevant to the segment. Video ad platform 116 ranks video ad-clip(s) with greater measured relevancy to a source video segment higher than video ad-clip(s) with lower measured relevancy to the segment.

In one implementation, video ad platform 116 uses metadata 124 associated with the ad-clips to determine whether associated ad-clip content is relevant to information in a user/entity profile. Independent of whether an ad-clip is contextually relevant to a source video segment, if the ad-clip is relevant to information in the user profile, the ad-clip is a targeted ad-clip. In one implementation, video ad platform 116 ranks targeted ad-clip(s) with greater total measured relevancy to a source video segment higher than targeted ad-clip(s) with less total measured relevancy to the segment. Total measured relevancy includes, for example, a combination of the measurement of contextual relevancy of the ad-clip to the segment and the measurement of the ad-clip's relevancy to information in the user profile. In another implementation, video ad platform 116 weighs an ad-clip's measurement of contextual relevancy differently than the ad-clip's measurement of user profile relevancy. For example, an ad-clip's measurement of contextual relevancy may have greater or lesser weight than the ad-clip's measurement of user profile relevancy. This allows video ad platform 116 to determine whether an algorithm (implemented by video ad platform 116) that matches a segment to an ad-clip will provide greater consideration to the ad-clip's relevancy to the user profile or the ad-clip's contextual relevancy to the segment.

For purposes of exemplary illustration, video ad-clips determined to be contextually relevant to a source video as a whole, contextually relevant to a source video segment (shot, scene, and/or chapter), and/or targeted video ad-clips are shown as "candidate ad-clips" in a respective portion of "other program data" 120. Such candidate ad-clips represent at least a subset of the video ad-clips available to video ad platform 116 via local and/or remote databases.

Video Ad-clip Insertion Points

In this implementation, video ad platform 116 determines/measures video ad-clip insertion points (positions/locations) with respect to wherein a timeline of a source video that ad-clip(s) will be inserted into a corresponding playback stream (e.g., stream 119), although other specifying criteria could also be used to identify an ad-clip insertion point. For example, if an ad-clip is to be inserted prior to the start of source video content playback operations, the insertion point is zero with respect to the timeline. In another example, if video ad platform 116 inserts an ad-clip 30 minutes into the source video content playback stream, the insertion point is measured as 30 minutes with respect to the timeline. Video ad-clip insertion points are predetermined or dynamically determined. Predetermined insertion points (hereinafter often referred to as "static insertion points") are automatically determined by video ad platform 116 prior to playback of the source content and will not be changed during playback (e.g., even if a viewer seeks forward or backward when watching the video). In one implementation, an administrator uses video ad platform 116 (or an independent video editor application) to add tags (e.g., XML tags, etc.) to the source video (e.g., in a header or other portion), where the tags identify where in the corresponding timeline that video ad platform 116 is to insert ad-clip(s). In one implementation, such a static insertion point tag will also specify one or more of the genre, name, or other attributes of the particular ad-clip(s) for insertion. A dynamically determined insertion point represents an insertion point that has been dynamically adjusted, modified, or added by video ad platform 116 during playback of the source content responsive to a user's viewing behavior/action, as described in greater detail below.

In another implementation, video ad platform 116 presents a user interface via a display device 130 to an administrator allowing the administrator to specify an algorithm or other criteria for video ad platform 116 to identify where in a timeline associated with source video to insert matching ad-clip(s). In one implementation, for example, such criteria is based on one or more of the length of the source video content, length and number of candidate ad-clip(s), the number of times to insert particular ones of the candidate ad-clip(s), indications of whether to select contextually relevant and/or targeted ad-clip(s) for insertion, etc. For instance, such static insertion point criteria may direct video ad platform 116 to insert multiple matching (targeted and/or contextually relevant) video ad-clips (consecutively or otherwise) into a source video playback stream, one ad-clip may be inserted multiple times into the source video, etc. In another example, such static insertion point criteria may direct video ad-platform 116 to insert twenty thirty-second matching ad-clips at spaced intervals in a two-hour source video. In another implementation, video ad platform 116 reads such static insertion point criteria from a configuration file (please see "other program data" 120). The actual number of matching ad-clips available for video ad platform 116 to insert into a particular source video is a function of administrator specified criteria, the number and content of video ad-clips available in local and/or remote databases for access, etc.

With respect to dynamically determined insertion points, video ad platform 116 dynamically determines such insertion points via one or more arbitrary and configurable video ad-clip insertion point criteria. In this implementation, such criteria are based on the user's viewing behaviors/actions (e.g., fast-forward, skip, seek requests, from a video player application). For example, responsive to receiving a request 128 to skip a particular portion of a source video being streamed for presentation to user, video ad platform 116 identifies any video ad-clips that were or would have been inserted during playback operations (e.g., at predetermined insertion points). Responsive to receiving a respective request 128 to resume playback of the source video at a particular position in the source video timeline, video ad platform 116 dynamically defines an insertion point and inserts ad-clip(s) at or subsequent to the particular position in the source video timeline where source video playback resumes. In one implementation, the inserted ad-clips represent ad-clip(s) associated with a skipped predetermined insertion point. As long as the user does not stop playback of the source video, this substantially ensures that a certain set of video ad-clip(s) will be presented for playback to a user independent of user actions.

In one implementation, video ad platform 116 ignores video jogging requests 128 (e.g., viewer actions such as fast-forward, skip, rewind, seek requests, etc.) from the user for a configurable amount of time to ensure that one or more inserted video ad-clips are sent to a video player application for playback to a user. For example, video ad platform 116 ignores video jogging requests 128 from a configurable amount of time before playback of one or more inserted video ad-clips to the end of the ad block.

In one implementation, video ad platform 116 inserts one or more ad-clips (candidate ad-clips) into a timeline represented by the source video as defined by at least a subset of any statically defined insertion point(s) during playback of the source video. In another implementation, video ad platform 116 inserts one or more candidate ad-clips at any statically defined insertion point(s) prior to playback of the source video. By definition, ad-clips are inserted at dynamically defined insertion points during source content playback operations. In one implementation, video ad platform 116 does not edit the source content to insert a candidate ad clip, as both a source video and an-clip generally represent different independent video streams. Rather, and in this implementation, video ad platform 116 interrupts streaming source video playback to insert video ad-clip(s) into the stream being communicated for presentation to a viewer. In one implementation, video ad platform 116 implements an application-programming interface (API) 132 to an audio/video player service/application to insert the ad-clip into the communication stream being used to communicate the source video content to the viewer. This is accomplished such that there are smooth transitions, cross fade, and/or other special effects during transition from the source content to the ad-clip.

In one implementation, the audio/video player service/application reads a description file generated, for example, by video ad platform 116 to identify the source video, ad-clip insertion points, and the corresponding candidate ad-clips for insertion. Video ad platform 116 communicates the source video and one or more inserted ad-clips for presentation by a video player (e.g., a respective application 118 or 136) to a user via a display device (e.g., a respective device 130 or 138). Alternate techniques to insert a video ad-clip at an insertion point include, for example, overlaying the ad-clip in a window on the source video frames, or caption/text superimposed on the bottom part of the video frames like typical captions, animations at the corner of video frames, etc.

In one implementation, one or more candidate ad-clips include embedded URL links for a viewer to select/click-through to a corresponding website. In this scenario, video ad platform 116 automatically collects such click-throughs to provide content providers and advertisers with viewer click-through statistics. For purposes of exemplary illustration, such a click-through data are shown as respective portion of requests 128. In one implementation, this statistical information allows content providers and advertisers to determine whether to add or delete metadata 124, which may include insertion point(s) and corresponding information to source videos, etc.

Exemplary Procedure

Figure 3:
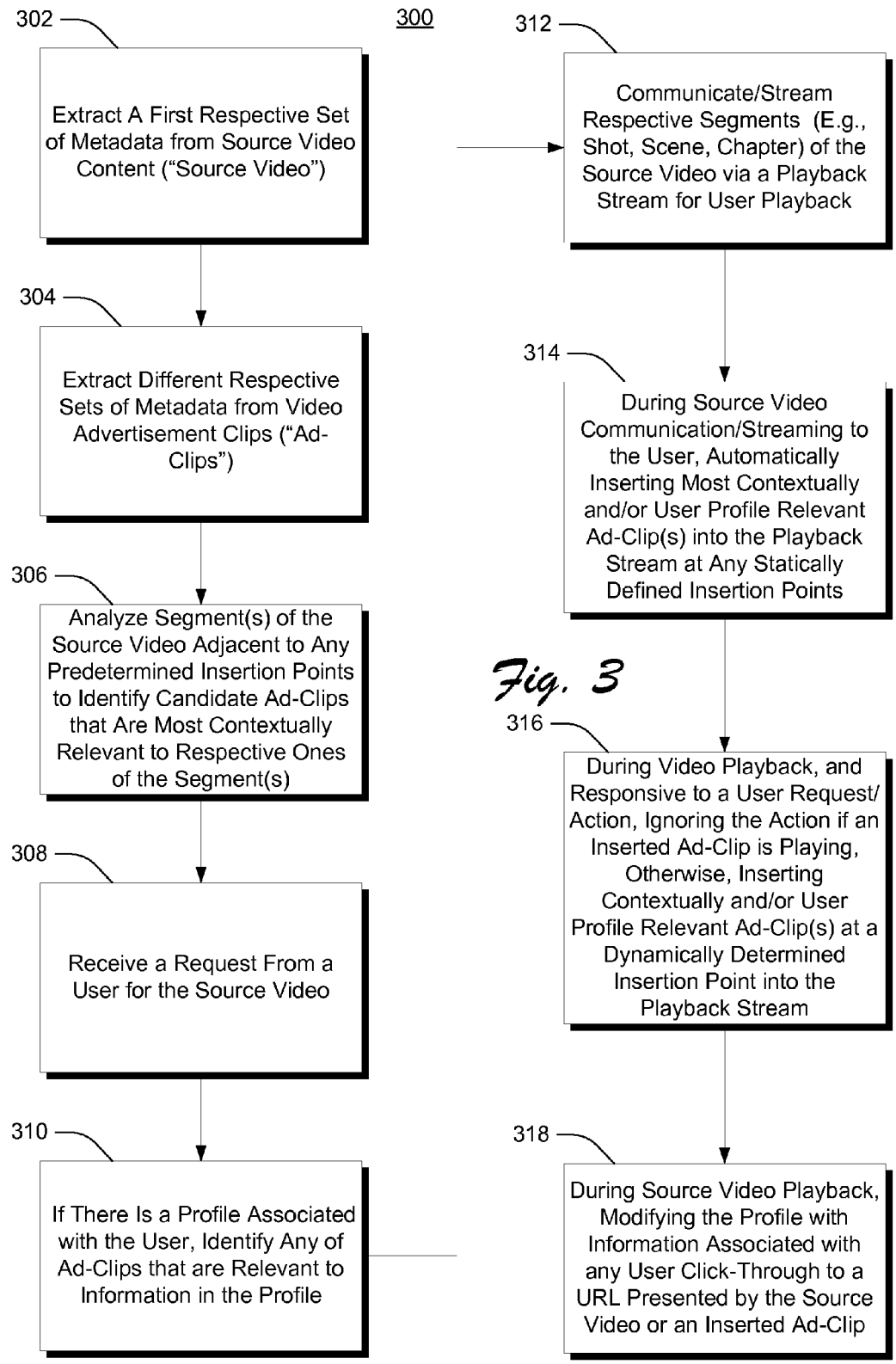
FIG. 3 shows an exemplary procedure for automatically inserting advertisements into source video content playback streams, according to one embodiment.

FIG. 3 shows an exemplary procedure 300 for automatically inserting advertisements into source video content playback streams, according to one implementation. In one implementation, operations of procedure 300 are implemented by respective program modules 112 of computing device 102 of FIG. 1. Operations of block 302 extract the first respective set of metadata 124 from source video content ("source video"). Operations of block 304, extract different respective sets of metadata 124 from video advertisement clips ("ad-clips"). Operations of block 306 analyze segments of the source video adjacent to any predetermined insertion points to identify candidate ad-clips that are most contextually relevant to respective ones of the segments.

Operations of block 308 receive a request from a user for the source video. Operations of block 310, if there is a profile associated with the user, identify any ad-clips that are relevant to information in the profile. Operations of block 312, communicate/stream respective segments (e.g., shots, scenes, chapters) of the source video to the user for presentation/playback via a playback stream (e.g., stream 119, a local playback stream, etc.). Operations of block 314, while communicating the source video to the user, automatically insert ad-clips that have been determined to be contextually and/or relevant to the user profile at any statically defined insertion points that are defined with respect to a timeline corresponding to the source video.

Operations of block 316, during source video playback, and responsive to receiving a user request/action, ignore the action if an inserted ad clip is playing (i.e., being presented to the user). Otherwise, the operations insert a contextually and/or user profile relevant ad-clip into the source video content playback stream at a dynamically determined insertion point. In one implementation, a dynamically determined insertion point is based on a current playback position in the source video. Operations of block 318 modify the profile with information associated with any user click-through to a URL presented with respect to the source video or an inserted video ad-clip.

Figure 4:
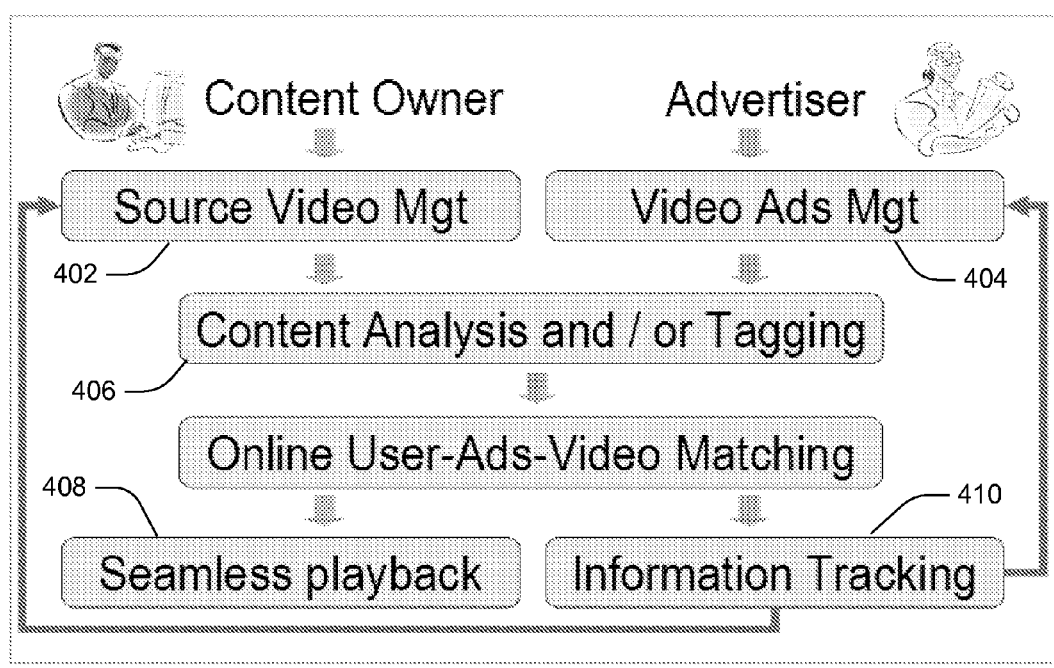
FIG. 4 shows an exemplary set of operations to automatically insert advertisements into source video content playback streams, according to one embodiment.

FIG. 4 shows another exemplary set of operations to automatically insert advertisements a stream playing source video content, according to one embodiment. Blocks 402 and 404 show that both content owners and advertisers can use the above described systems and methods to manage how advertisements will be automatically inserted into the stream by video ad platform 116. Specifically, source video management and video ads management operations represented by blocks 402 and 404 include, for example, inserting textual metadata into source video and/or video ad clips. As described above, such textual metadata, for example, directs where video ad platform 116 of FIG. 1 will insert one or more video ad-clips into the stream as it is being communicated for presentation to a user, identify a genre or other attributes of an ad-clip to insert, provide contextual information to source video segments and/or ad-clips, etc. Operations of block 406 correspond to video ad platform's extraction of metadata from the source video and ad-clips. At least a portion of this metadata may have been provided by tagging operations, where an administrator (e.g., the content provider/owner, advertiser, etc.) inserted tags into the source video and/or respective ones out of the ad-clips. Operations of block 408 correspond to matching respective ones of the ad-clips to segments in the source video that are adjacent to video ad-clip insertion points that are defined, for example, with respect to a timeline associated with the source video. These matching operations are performed online, during playback/streaming of the source video for presentation to a viewer. In one implementation, these matching operations match information in a profile associated with the viewer to content and the ad-clip(s).

Operations of block 410 correspond to seamless playback of the source video content stream. Such seamless playback includes inserting the matched ad-clip(s) into the playback stream at corresponding ad-clip insertion points so that there are smooth transitions between playback of source video content and playback of respective ones of the inserted ad-clips. Operations of block 412 collect information from the viewer to generate a user profile. Such information includes, for example, viewer click-throughs to a URL presented to the viewer in an inserted video ad-clip, etc. As shown in FIG. 4, this information can subsequently be communicated to administrators (e.g., source video content providers/owners, advertisers, etc.) for additional source and video ad-clip management.

Conclusion

Although the above sections describe automatically inserting advertisements into video content playback streams in language specific to structural features and/or methodological operations or actions, the implementations defined in the appended claims are not necessarily limited to the specific features or actions described. Rather, the specific features and operations for automatically inserting advertisements into source video content playback streams are disclosed as exemplary forms of implementing the claimed subject matter. For example, FIG. 1 shows computing device 102 coupled across network 104 to a remote computing device 106. In one implementation, however, computing device 102 is not coupled across network 104 to a remote computing device 106, and video ad-platform 116 operations are independent of such a connection.

The invention claimed is:

1. A method at least partially implemented by a computer system, the method comprising:
   communicating a video content stream to a user to present at least a portion of a source video to the user;
   determining one or more insertion points in the video content stream for inserting one or more advertisements using a timeline of the source video;
   receiving a video navigation request to skip a portion of the video content stream that includes an insertion point for a particular advertisement during a playback of the video content stream, and in response to receiving another video navigation request to resume the playback of the video content stream following the skip of the portion of the video content stream, determining an additional insertion point for the particular advertisement in a subsequent portion of the video content stream; and
   inserting the particular advertisement at the additional insertion point for display when the playback of the video content stream reaches the additional insertion point.

2. The method of claim 1, wherein the portion of the source video comprise one or more of a shot, a scene, and a chapter.

3. The method of claim 1, wherein each of the one or more insertion points is a statically determined insertion point.

4. The method of claim 1, wherein an insertion point corresponds to a shot boundary or a scene boundary in the source video.

5. The method of claim 1, wherein the particular advertisement is a video advertisement clip.

6. The method of claim 1, wherein the particular advertisement is at least one of contextually relevant to a segment of the source video adjacent to the additional insertion point or targeted to information in a user profile associated with the user.

7. The method of claim 1, wherein the communicating further comprises streaming the source video to a remote computing device for presentation to the user.

8. The method of claim 1, wherein the method further comprises:
   extracting a first set of metadata from the source video;
   extracting second sets of metadata from a set of advertisements;
   evaluating the first set of metadata and the second sets of metadata to identify a set of candidate advertisements that are contextually relevant to source video content adjacent to an insertion point; and selecting the advertisements from the set of candidate advertisements.

9. The method of claim 8, wherein each set of metadata comprise low-level content-based features, high-level semantic attributes, or textual information.

10. A computer-readable data storage device having computer-executable instructions for performing steps comprising:

extracting sets of metadata from a source video and a set of video advertisement clips, at least a portion of the metadata being text data inserted into the source video by an administrator;

evaluating the sets of metadata to identify a contextual relevancy of each video advertisement clip to a segment in the source video;

evaluating a profile of a user and the set of video advertisement clips to identify a user profile relevancy of each video advertisement clip to the profile of the user;

assigning a first weight to a corresponding contextual relevancy of each video advertisement clip and a second weight to a corresponding user profile relevancy of each video advertisement clip to the profile of the user, the first weight being different from the second weight;

calculating a corresponding total measured relevancy for each video advertisement clip based on the corresponding contextual relevancy and the corresponding user profile relevancy;

ranking the set of video advertisement clips based on total measured relevancies to identify a particular video advertisement clip that is most contextually relevant to the segment and most user profile relevant to the user profile;

inserting the particular video advertisement clip into a playback stream at an insertion point in the source video during playback of the source video for presentation to the user, wherein the insertion point is adjacent to the segment in the source video being streamed;

receiving, during the playback of the source video, a video navigation request to skip a portion of the playback stream that includes the insertion point for the particular video advertisement clip; and in response to receiving another video navigation request to resume the playback of the source video following the skip of the portion of the playback stream, determining an additional insertion point for the particular video advertisement clip in a subsequent portion of the playback stream.

11. The computer-readable data storage device of claim 10, wherein the sets of metadata comprise low-level content-based features, high-level semantic attributes, or textual information.

12. The computer-readable data storage device of claim 10, wherein the metadata includes text identifying a predetermined insertion point defined with respect a shot or scene boundary of the source video.

13. The computer-readable data storage device of claim 10, wherein the sets of metadata comprise data identifying color, motion, genre, location, objects, and text.

14. The computer-readable data storage device of claim 10, wherein the insertion point is a dynamic insertion point defined responsive to receipt of a source video navigation request from the user.

15. The computer-readable data storage device of claim 10, wherein the computer-executable instructions further comprise instructions for performing steps comprising collecting user click-through statistics information to generate the profile of the user.

16. The computer-readable data storage device of claim 10, wherein the inserting the particular video advertisement clip into a playback stream at an insertion point in the source video comprises:

overlaying the particular video advertisement clip in a window on the source video; or superimposing a caption or text associated with the particular video advertisement on a portion of the source video.

17. The computer-readable data storage device of claim 10, wherein the determining the additional insertion point for the particular video advertisement clip comprises dynamically defining the additional insertion point at a position where the source video resumes the playback.

18. A computing device comprising:

a processor; and a memory coupled to the processor, the memory comprising computer-program instructions executable by the processor for performing steps comprising:

collecting advertisement click-through data associated with a user by identifying one or more links embedded in each of one or more advertisements that the user has selected, the one or more advertisements being inserted into a plurality of source videos viewed by the user;

determining one or more insertion points for a source video based at least on the advertisement click-through data of the user;

responsive to a request from the user to stream the source video to the user for presentation, evaluating a profile of the user to locate a video advertisement clip that is relevant to information in a profile associated with the user;

during streaming of the source video to the user, automatically inserting the video advertisement clip into the source video at the one or more insertion points to generate a modified video stream;

receiving a video navigation request to skip a portion of the modified video stream that includes the one or more insertion points; and in response to receiving another video navigation request to resume playback of the modified video stream following the skip of the portion of the modified video stream, determining an additional insertion point for the video advertisement clip in a subsequent portion of the modified video stream.

19. The computing device of claim 18, wherein the steps further comprise responsive to detecting a subsequent video navigation request from the user during the playback of the modified video stream following the skip of the portion of the modified video stream, ignoring the subsequent video navigation request if the video advertisement clip is currently being streamed to the user for playback, the subsequent video navigation request being ignored at least until playback completion of the video advertisement clip.

20. The computing device of claim 18, wherein the steps further comprise responsive to detecting a subsequent video navigation request from the user during the playback of the modified video stream following the skip of the portion of the modified video stream, ignoring the subsequent video navigation request if the video advertisement clip is within a predetermined time threshold of being streamed to the user for playback.

* * * * *